United States Patent [19]

Pryor

[11] Patent Number: 4,838,696
[45] Date of Patent: * Jun. 13, 1989

[54] PULSED ROBOTIC INSPECTION

[75] Inventor: Timothy R. Pryor, Windsor, Canada

[73] Assignee: Diffracto Ltd., Windsor, Canada

[*] Notice: The portion of the term of this patent subsequent to Apr. 29, 2003 has been disclaimed.

[21] Appl. No.: 779,457

[22] Filed: Sep. 24, 1985

Related U.S. Application Data

[63] Continuation of Ser. No. 761,315, Jul. 30, 1985, Pat. No. 4,585,350, which is a continuation of Ser. No. 462,127, Jan. 8, 1983, abandoned.

[51] Int. Cl.⁴ ........................ G01B 11/14; G01B 11/24
[52] U.S. Cl. ........................................ 356/375; 33/707; 250/237 G; 356/376
[58] Field of Search ............... 356/372, 373, 375, 376, 356/383, 384, 385, 387; 901/2, 47; 33/125 A, 125 C; 250/237 G

[56] References Cited

U.S. PATENT DOCUMENTS 4,585,350  4/1986  Pryor .................................. 356/375

Primary Examiner—F. L. Evans
Attorney, Agent, or Firm—Larson and Taylor

[57] ABSTRACT

Robotic machines such as coordinate measuring machines, contour projectors and other optical measuring machines are provided wherein a pulsed light is used to "freeze" the dimensional or positional data. The light source of an electro-optical sensor which in motion on the machine during an inspection operation is pulsed responsive to a triggering pulse from an encoder. Where the motion is in more than a single axis, the triggering pulse can be provided from that encoder which experiences the most rapid motion or which is associated with the direction of the greatest dimension change of the part under inspection. Several different forms of position encoding apparatus are also disclosed.

4 Claims, 3 Drawing Sheets

PULSED ROBOTIC INSPECTION

This is a continuation of application Ser. No. 761,315 filed July 30, 1985, now U.S. Pat. No. 4,585,350, which, in turn, is a continuation of application Ser. No. 462,127, filed on Jan. 28, 1983 and now abandoned.

TECHNICAL FIELD

This invention relates to robots and robotics used in the inspection of parts.

BACKGROUND OF THE INVENTION

The automated factory of the future, in order to provide flexible manufacturing of various types of parts, will require versatile robotic type machines for inspecting the parts and for producing feedback correction signals to the machines as well for insuring that defective products are not released. In order to provide such inspection, various programmable coordinate measuring machines have been proposed using contact feelers and the like.

The weak links of virtually all of the approaches heretofore are generally two. First, these approaches are only capable of providing dimensional measurements and cannot inspect for the other aspects of the part, such as defective surface finish. Second, these approaches are also slow because of the time required for the sensor probe to make contact. It will be appreciated that there are definite limits on the maximum speed at which a measurement can be made when it is necessary to stop and touch a part in order to make the measurement. This is particularly true when accuracies that approach values as small as 2 or 3 microns are desired as in most inspections of a finished machined part.

A general solution to the problems discussed in the previous paragraph involves the use of an inspection robot based on optical sensing principles. One example of a robot control system of this type is that disclosed in my copending application Ser. No. 262,492, filed on May 11, 1981 and entitled "Electro-Optical Systems for Control of Robot Manipulator Arms and Co-ordinate Measuring Machines" now U.S. Pat. No. 4,453,085.

SUMMARY OF THE INVENTION

In accordance with the present invention, methods and apparatus are provided for providing dimensional or positional data "on the fly" in a highly accurate manner and at rates which are extremely fast particularly as compared with contact-type robot sensors of the prior art. Generally speaking, the invention involves the use in robotic apparatus employing optical signals, of light pulsing for "freezing" robot position determination data in time. For example, the invention is applicable to systems which use X-, Y-, and Z- axis optical encoders and like optical encoders, optical sensors and/or optical axis compensators and in operation, the various devices are pulsed or strobed simultaneously so as to "freeze" the readings of the electrooptical detector arrays or optical readers. All of these readings are then fed to a computer which accurately computes the part location based on these input data.

In one embodiment, at least one encoder is used in determining the position of the robotic apparatus and the optical reader is triggered by a pulse from the encoder. Typically, a plurality of encoders are used and the reader is triggered from one or more selected encoders, e.g., the encoder experiencing the greatest rate of change, i.e., that undergoing the greatest relative movement or that detecting the greatest dimensional change in a part under inspection. The light source of the encoder can also be pulsed to determine the absolute position of the encoder at. the time of the pulse. Further, internal and external axis compensation devices can be pulsed simultaneously.

Other aspects of the invention concern the provision of positional data for robotic apparatus through the use of several different techniques. In one embodiment, a scanning detector array is utilized in inspection of a continuous surface and is scanned at a very high rate so as to "blur" the data output therefrom, curve fitting techniques being used to reconstruct the surface contour.

According to a further aspect of the invention, optical linear or rotary encoder apparatus is provided which, in one embodiment, uses a scale employing widely spaced lines together with a combination continuous wave and pulsed light readout, or with a pulsed diode array readout only. In a related embodiment, the teeth on the rack of a rack and pinion drive mechanism, the threads of a drive screw, and the like can be read rather than an encoder scale. In another embodiment, a conventional scale with relatively coarse spacing is used in combination with a pulsed light source diode array readout.

Other features and advantages of the invention will be set forth in, or apparent from the detailed description of the preferred embodiments which follows.

DETAILED DESCRIPTION OF THE PREFERRED EMBODIMENTS

Figure 1:
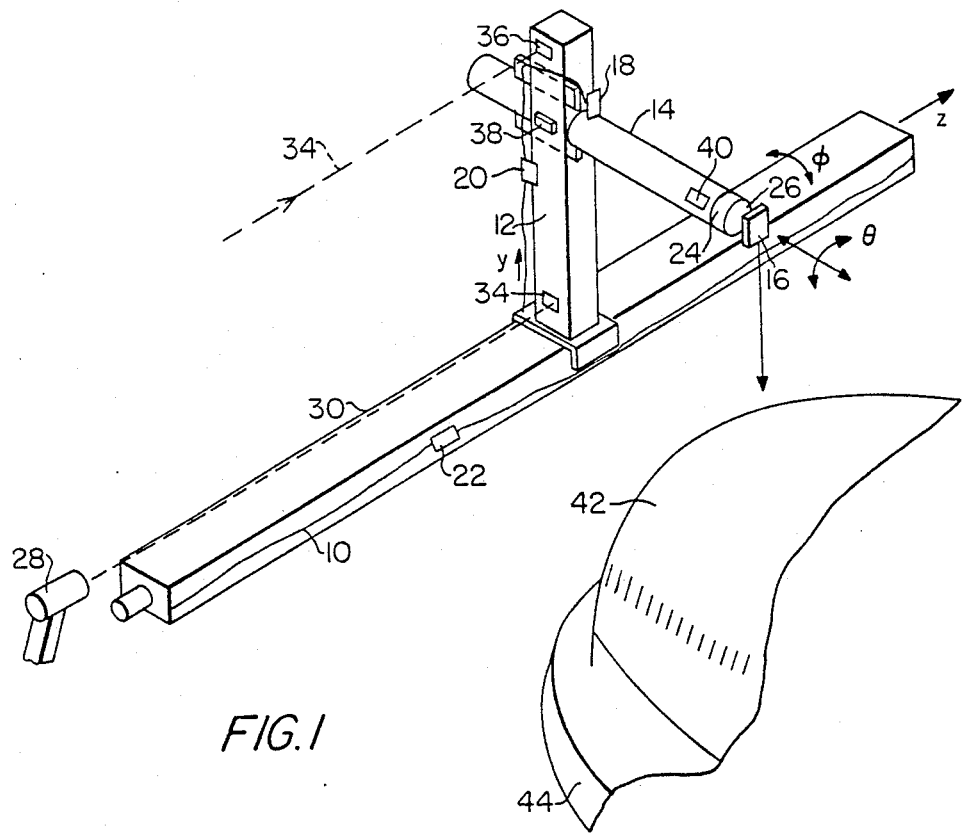
FIG. 1 is schematic, perspective view of robotic apparatus of one type to which the present invention is applicable.

Referring to FIG. 1, a system is illustrated which is used to provide position data or to correct position data on a coordinate measuring machine (CMM) or cartesian axis robot. The system is of the general type disclosed in U.S. patent application Ser. No. 262,492 referred to above and reference is made to that application for a description of the details thereof. It would be understood that the illustrated system is merely exemplary of the type of system to which the invention is applicable and that the invention is not limited to application to such a system. The system illustrated in FIG. 1 includes a base 10 along which a motorized vertical (Y-axis) arm 12 travels in the direction of the Z axis. A horizontal arm 14 mounted on vertical arm 12 moves in and out along the X-axis. Further rotational axes, e.g., rotational ($\theta$) and yaw ($\phi$), are provided at the end (wrist) of horizontal arm 14 which enable a sensor package or unit 16 located at the end of arm to rotate about the X-axis and about the yaw axis under the control of a suitable drive unit (not shown). A sixth wrist roll axis, and/or part rotation axis (not shown) can also be provided.

An X-axis, horizontal arm encoder 18, a Y-axis vertical arm encoder 20 and a Z-axis, base encoder 22 are also provided for indicating the X, Y and Z coordinates of sensor 16, while a pair of rotational encoders 24 and 26 indicate the angular portion. The output signals from all of the encoders are fed to computer (not shown).

In addition, as disclosed in Ser. No. 262,492, a plurality of axis compensation (AC) sensors are provided. Considering the sensor arrangement which provides X-axis compensation as exemplary, a laser 28 produces a beam 30 which is received by a position sensitive detector 32 comprising a driftless matrix array or analog sensor, e.g. an UDT-SC-10. (It is noted that the beam can be located higher up on arm 12 as indicated by beam 34 and detector 36.) A similar arrangement of a laser 38 and detector 40 is provided for correction of "droop" or downward Y-axis deviation of horizontal arm 14. It is noted that an additional arrangement (not shown) can be mounted on vertical arm 12 and that other sensors can be employed, such as the external axis compensation sensors disclosed in Ser. No. 262,492. Further, optical axis compensation sensors modeled after the displacement sensing devices disclosed in U.S. Pat. No. 4,276,698 (Dore' et al) can also be used.

In the illustrated embodiment, the optical sensor unit 16 is used to sense the contour of a part 42 (e.g. an automobile hood) mounted on a turntable 44.

Figure 2:
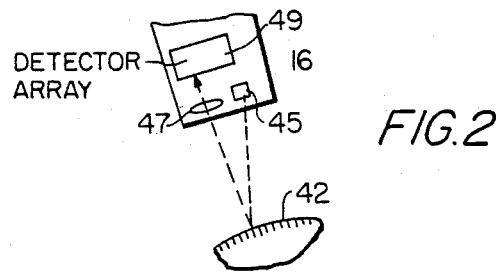
FIG. 2 is a side elevational view of a detail of the sensor of FIG. 1.

As shown in FIG. 2, optical sensor unit 16 comprise an optical triangulation system comprising a light source 45 such as a pulsed diode laser and a lens 47 which focuses an image spot onto a detector array or optical reader 49, such as a Reticon 256C.

Turning now to the present invention, as discussed above, measurement speed is critical in inspection systems of the type being considered and it is the aim of the invention to provide accurate inspection of parts "on-the-fly", in contrast to the contact feeler inspection systems of the prior art. In general, the present invention involves reading, electronically, the output data from all dimension sensors at the same time, i.e., considering the system of FIG. 1, simultaneous reading of the outputs of the X-, Y- and Z-axis encoders, diode array sensors, and axis compensators, etc., and in this way, to compensate, inter alia, for droop of the horizontal arm 12 as well as for inertial forces causing unwanted deflections of the sensor unit 16. This is accomplished in accordance with the invention by "flashing" the light source of the diode arrays, i.e., strobing the array with a short light pulse to "freeze" the triangulation spot image (or other image such as a profile or reflected image) when triggered by an encoder pulse or to trigger the "read" cycle of the optical sensor (detector) array from the axis encoder which is moving the fastest or in the direction of greatest sensor signal (the increase in sensor signal being due for example, to a rapid change in the shape of the part owing to a steep slope in the surface contour). Advantageously, for true three (or more) axes measurement all three (or more) encoder readings are "freezed" simultaneously with each other and with the outputs of the sensors. As explained below in connection with FIG. 4, a pulsed laser system can be used for this purpose. Further, if axis compensation sensors are used, the readings thereof should also be "freezed" in response to the read command signal.

Figure 3:
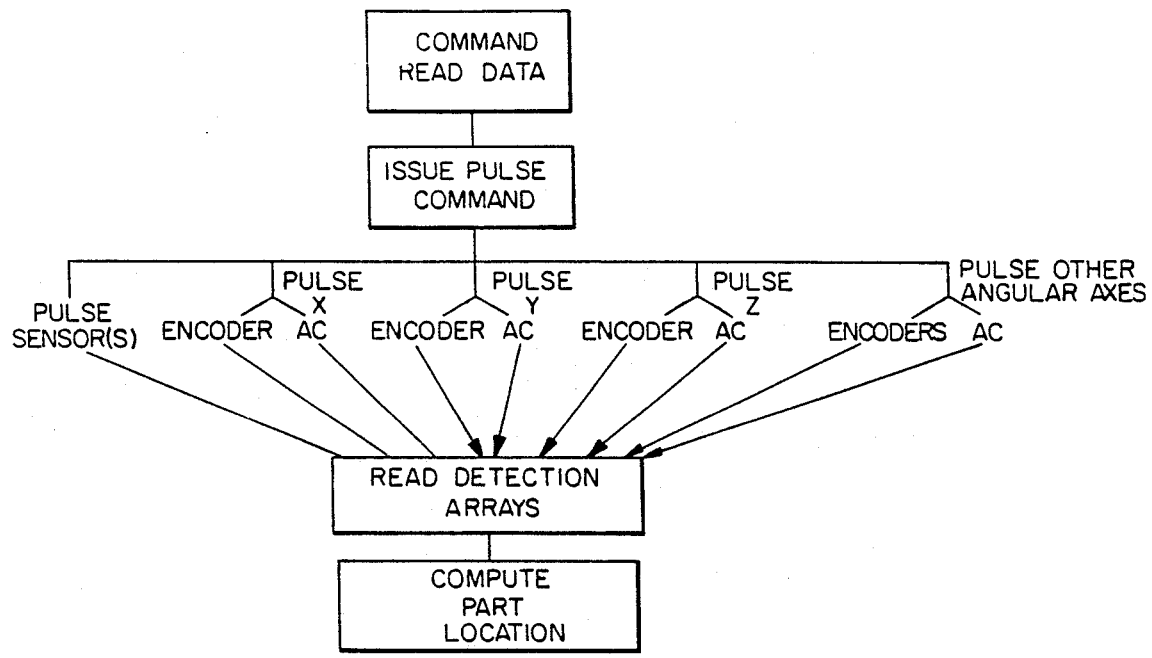
FIG. 3 is a flow chart outlining the basic operation of the control system of the invention.

Referring to FIG. 3, a flow chart for pulsed readout system is shown. As illustrated, a "read data" signal is commanded which results in the issuance of a pulse command to the various sensors illustrated in FIG. 1, including encoders and optical axis compensation (AC) arrangements. The corresponding detector arrays are read simultaneously and the resultant outputs are fed to a computer which computes the part location based on the data received thereby.

Figure 4:
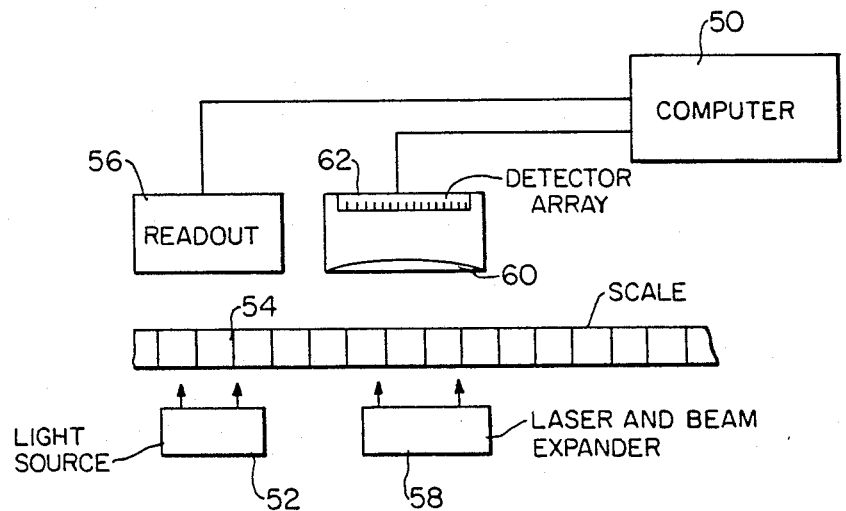
FIG. 4 is a schematic diagram of an encoder arrangement constructed in accordance with a further aspect of the invention.

Referring to FIG. 4, a pulsed light source encoder arrangement is shown. One input to a computer 50 is provided by a light source 52 which focuses a light beam through a scale 54 onto a conventional readout device 56. In addition, a diode laser and associated beam expander 58 is provided which produces a laser pulse in the form of, e.g., a 100 n sec burst which is transmitted through scale 54 and a lens 60 to a detector array 62. The diode array axis and the conventional sensor encoder axis (e.g., phase quadrature) are geometrically related, and the techniques disclosed apply to rotary as well as linear encoders. Through the provision of a fast pulse light source the encoder arrangement of FIG. 4 is capable of "on-the-fly", rapid, submicron measurements. A somewhat similar arrangement is disclosed in U.S. Ser. No. 134,465 (see pages 14 to 18 and FIG. 12A), now U.S. Pat No. 4,403,860, issued on Sept. 13, 1983. Further, one type of scale that can be used as scale 54 in FIG. 4 is that disclosed in U.S. Pat. No. 4,074,258.

However, in accordance with a preferred embodiment, scale 54 comprises a conventional scale made up of a plurality of equispaced lines. The photodiode detector array 62 is able to determine, in an absolute manner, the shift of lines at the strobed time of the array, in manner similar to that disclosed in Ser. No. 134,465, referred to above. This approach permits a very coarse scale to be used, i.e., one in which the spacing between lines is relatively wide, (e.g., 0.002 inch) while still achieving very high resolution. This high resolution can be provided using the techniques disclosed in U.S. patent application Ser. No. 163,290, now U.S. Pat. No. 4,394,683, issued July 19, 1983, whereby the scale divisions, i.e., the spacings between lines, can, in effect, be broken down into smaller divisions using the digital interpolation techniques described in the application in question. In fact, because of this high resolution of the sensor array output, the scale used can be, relatively speaking, very coarse, i.e., lines every 0.05 inch, to provide readings to 10 microinches. In such an embodiment, the conventional encoder sensor arrangement can be eliminated because data can be taken at a rate fast enough to eliminate missed data due to movement of scale 54 more than 0.05 inch between scans.

Figure 5:
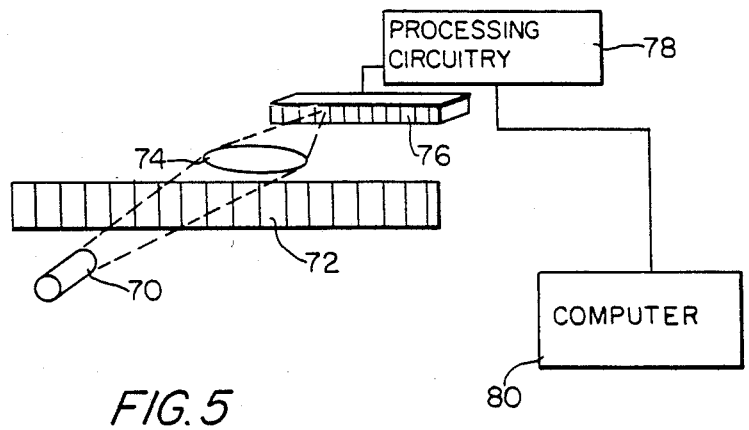
FIG. 5 is a schematic diagram, in perspective, of a linear encoder constructed in accordance with a further embodiment of the invention.

To explain, reference is made to FIG. 5, which discloses an encoder system including a pulsed light source 70 which directs light pulses past a scale 72 having scale lines spaced, in this example, 0.05 inches apart and a lens 74, providing 4:1 magnification, to a detector array 76 typically consisting of 1000 detectors spaced 0.001 inches apart. A signal processing circuit 78 is connected to the output of array 76 and the arrangement provides at least 35× magnification. If the scanning rate is 500 scans per second so that a scan is provided every 0.002 second, then for a line to move on and off in one scan (thereby losing track), the scale 72 would have to move 500×0.05 or 25 inches per second which is considerably faster than is required for the system. A computer 80 connected to the array enables the system to start at the "home" position line and to provide appropriate scanning.

Figure 6:
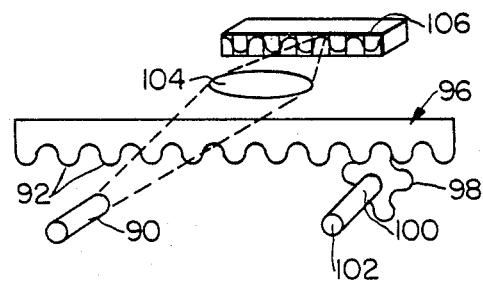
FIG. 6 is schematic diagram, in perspective, of a further encoder embodiment of the invention.

A further, low cost, coarse reading embodiment of this aspect of the invention is that illustrated in FIG. 6. In this embodiment, the light output beam from a light source 90 impinges on the teeth 92 of the rack 94 of a rack and pinion drive mechanism 96. A pinion 98 is connected to a drive motor 100 whose rotation is monitored by a rotational encoder 102. The beam from source 90 is focused by a lens 104 on a linear array 106 which determines the relative position of the image of rack teeth 92. This arrangement eliminates an encoder as such, and reads the position of the rack teeth 92 to upgrade the data from the rotational encoder 100 of drive motor 98. This approach eliminates errors caused by backlash and the like, and by averaging the reading over a large number of teeth 92, the effect of local gear errors can be obviated. It will be understood that this same approach can be used in a ball screw drive, and like mechanisms.

It is noted that the systems of FIGS. 4 to 6 can be factory calibrated using a laser interferometer or the like, a process which is especially easy with systems using coarse spacing or pitch. The use of high resolution linear array sensor, whether pulsed or not, permits a degree of interpolation between the scale lines such that coarse spacing can be used so that it is necessary to store only a few, relatively speaking, calibration points. For example, 1000 calibration points can be stored on 0.050 inch centers for a 50 inch scale.

Figure 7:
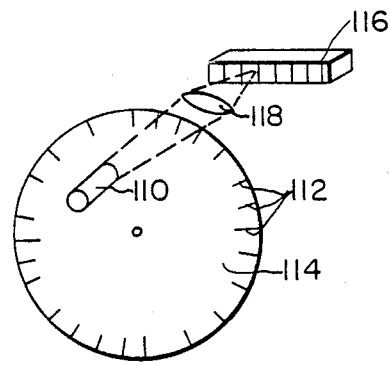
FIG. 7 is a schematic diagram, in perspective, of a rotary encoder embodiment of the invention.

It is also noted that while the encoders discussed above use linear scales, a rotary scale can also be used as is illustrated in FIG. 7. In FIG. 7, a light source 110 provides imaging of the peripheral scale lines 112 of a rotary disc member 114 onto a detector array 116 via a lens 118. Optical fibers (not shown) can be employed to enable detector 116 to be remotely located.

To recapitulate, and expand the possibilities with respect to providing on-the-fly readings, techniques that can be used include strobing the scan of the diode array or pulsing the light source used for illumination with a very short burst as the encoder moves from one count to the next, because this point on the encoder can be well defined as to the position thereof. Another approach involves operating the diode array at an extremely high scan rate or short integration time relative to the robot part movement rates to avoid blur (an approach which requires a large amount of light power which may or may not be available). A further technique that can be used with continuous surfaces is to employ a curve fitting operation to reconstruct the original curve in an acceptable manner even in the presence of "blurred" data. An additional technique which is usable even with single encoder systems but is more necessary with multiple encoder systems is to utilize pulsed light sources to freeze the interpolated encoder portions at the same time a "freeze motion" light source is used in conjunction with optical sensor so that both the encoder and sensor data are frozen in synchronism.

It should be noted that the sensors used can be of the type disclosed in my copending U.S. patent application Ser. No. 461,865, entitled "Sensing Location of an Object", filed on Jan. 27, 1983, which application is hereby incorporated by reference.

It is also envisioned that high speed light sensing will be coupled with the data acquisition from the various encoders and axis compensation units described above.

Thus, it is within the purview of the invention to provide simultaneous reading of all the encoders, the axis compensation units and the sensor unit, whether or not any, or all, of the light sources used therewith are actually pulsed.

It is noted that the axis compensation provided, which typically can be carried out as disclosed herein with a matrix photodetector array, benefits from the use of a pulsed light source since the array scan rate is typically not fast enough to measure rapidly the position of the mechanical structure in two axes. If one axis (linear) detector arrays are used, that is, those providing compensation in only one axis, these arrays can be much faster in operation.

Accordingly, it is also within the purview of this invention to transmit a trigger pulse to the light source of the sensor unit, for example, and thereby cause that unit to produce a light pulse to freeze sensor data. In turn, a strobe pulse is transmitted to lock up the readings of all the axes encoders as rapidly as possible. Obviously, if the axes compensation units are to be read out with matrix arrays, it would also be highly advantageous to provide for "firing" a light pulse in the axes compensation sensors at the same time that "firing" the light pulse in the sensor unit takes place, thereby freezing their readings as well. If conventional axes encoders (i.e., optical encoders, inductosyn encoders and the like) are used, one would read the last encoder count before the strobe pulse to the encoder is received. Naturally, if pulsed light source encoders such as disclosed above are used, these encoders could also be pulsed.

In many cases, however, it is not possible to effectively pulse the light source of the sensor unit with a short burst sufficient to "freeze" part data. This has to do with certain power level requirements that must be met to operate at least with pulse light sources presently available as well as with array sensitivities, and considerations involving the form, reflectivity, color and condition of the part surfaces, and the like, from which light must be returned to the sensor.

Our solution to such problems is to use an image intensifier to amplify the faint light reflected from the surface within a short weak pulse. However, this approach also amplifies other ambient light as well, which may be a problem in factories. An image intensifier, such as a microchannel intensifier, can itself be time rated, so that rather than having to pulse the light source one can "pulse" the sensor.

Figure 8:
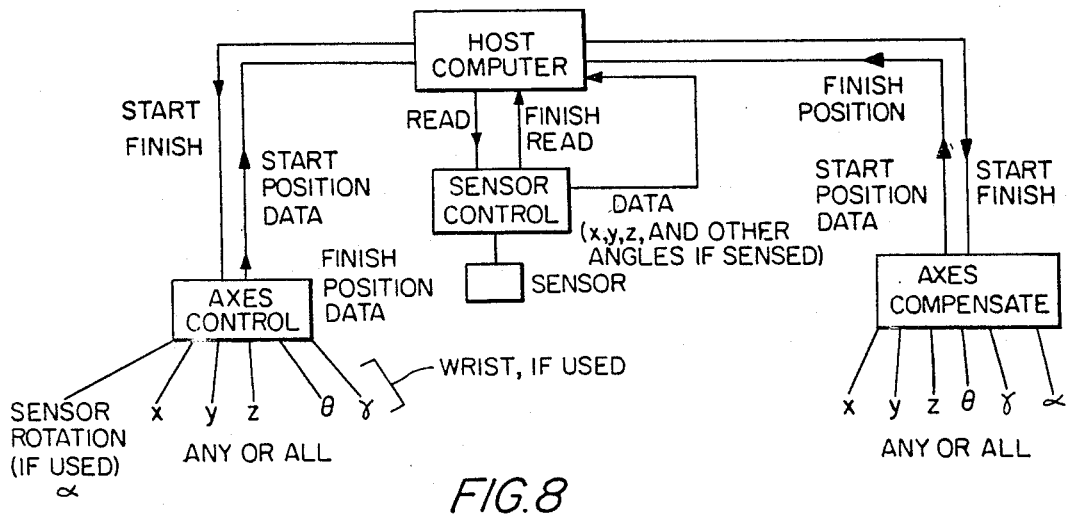

Another approach in dealing with the problem of long integration times is to provide another mode of machine operation, using the system illustrated in FIG. 8, in which a start read pulse is sent to the sensor unit from a central controller or host computer. This pulse can further be produced, but is not necessarily produced, in response to a start signal from one of the moving coordinate axes, typically the one in which the greatest changes are noted.

On receipt of the start signal, the sensor unit detector array (or other sensor unit) commences its integration of the light received from the part and, in accordance with an important difference from the previously described embodiments, the machine encoders continue to read during this integration period until such time as the sensor signals back that it has received enough light to get a reading. At this time a "finish read" signal is produced. In addition, the positions of the encoders at the end of the reading are noted and the mean (or other) position over which the data is taken is computed from the start and stop positions of the encoders. This mean position is assumed to correspond to the mean location of a spot, line or edge on the sensor array during the integration time (during which a slight blur, a spot, or the like occurs).

As has been discussed above, matrix arrays of the type being considered typically require relatively long integration times in order to receive sufficient light back from the test surface, from either the white light surface illumination or the diode laser triangulation projection, in order to obtain enough data to produce a meaningful reading. Typically, such integration times can be on the order of 1/10 to 1/200 of a second. While these times may appear fast, such times are actually relatively slow if the measuring machine arm is moving relatively rapidly over a part, particularly one whose contour is also changing rapidly. Accordingly, to produce a measurement in this case, as discussed above, an external data command from a host computer is given to the sensor controller to start scanning. At the same time, a data request is made to the axes encoders and axes compensation units (if used) for their positional data at the start of the detector array integration.

When the sensor has returned a "finish read" command to its controller, the final positional data from the axes encoders and axes compensation units (if used) are requested and this data transferred to the computer. By knowing the starting and end points of the axes encoders and axes compensation (if used) during the measurement, the mean location in space of the sensor during the measurement can be obtained. This location information, when combined with part location data produced by the sensor unit, provides the data as to where the part is in space.

In a case where both integration and scan time is appreciable in the operating mode discussed above, the "finish read" signal should be produced after the scan is complete. If the integration time is short relative to scan time, the "finish read" signal should be produced after the integration time is complete and the light source turned down (to thereby stop integrating the light charge on the sensor array).

Another aspect of this process should also be considered. Specifically, while the integration referred to above is taking place, the spot width or image is moving on the detector array, due to the motion of the machine. In the method described the mean location is the same regardless of the direction of the scan, so long as the array can be read out at high speed (e.g. 1/2000 sec.) even with a long integration time (e.g. 1/30 sec.). This is the case with many linear arrays. However, if the scan time is also long, the direction of scan relative to the array will make a difference with respect to the spot or edge position. Compression results, for example, when the scanning direction of the array is opposite to that of the movement of the "spot" (or line or the like) on the array surface. Conversely, an elongation of the spot, and a shift in the apparent position thereof, will occur if the scan is long, and in the same direction, as the spot movement.

When scan rates are relatively long, blur errors can advantageously be minimized by scanning the array (or like devices, e.g., TV camera, etc.) in the direction opposite to the direction of movement.

Despite the emphasis on pulsed light sources in the discussion above, the invention is also applicable for use with CW sources and high speed array scans and/or data strobes to "lock up" co-ordinate axes and/or compensation data at high speeds.

The use of curve fitting has been described above as an approach in reducing blur error at slow scan rates for relatively continuous contour surfaces where array data points can be taken. Another axes interpretation technique, usable even with one scan only, will now be described.

Suppose the photodetector array sensor, such as that illustrated in FIG. 2, requires 1/30 of a second to integrate enough light on the detector array to provide a good reading from a surface with a relatively low reflectivity, even with the maximum light energy that can be produced by light source 45. To substantially reduce or eliminate blur error it is necessary to: (1) slow the axes rates down to where, in 1/30 of a second, negligible movement occurs, or compensation is required, or (2) determine the mean position of the axes (and axes compensation units if used) during the sensor integration time, and assume that the mean position sensed (which, in the embodiment of FIG. 2, would be a triangular spot on the array), during the integration time, occurs at the mean axes position during the 1/30 second period.

Clearly the second option allows faster reading rates, although both options can be combined.

We will now consider another approach in utilizing relatively slow scan matrix array devices with long integration times compatible with conventional light sources. A serious problem with matrix arrays is the long time period necessary to read all the elements of the array. For example, even at a fast 1 MHZ clock rate a 256×256 element matrix array having approximately 64,000 elements takes 1/15 second to fully read out. This is a long time for a sensor mounted on a moving machine (or sensing a moving part) if high accuracy is desired.

For triangulation use however, as in the embodiment of FIG. 2, one can actually use the sensing of the spot to control the axes encoder data acquisition and possibly the sensor array clock rate. For example, if the array 49 in FIG. 2 is a matrix array, the charge is first dumped from the array before measurement begins. At this point, the approximate location of the projected spot (line, edge etc.) on the array is noted. Then, on the next scan, it is only just when the approximate zone of the spot is detected that the coordinate axes encoder data starting point are enabled and only just after the spot is scanned by the array, when the encoder data end points are locked up, in order to obtain the mean. Thus, for spots which occupy only 20 lines of the array, the reduction in reading time is 25:1 on a 256 element array.

In the same vein, one can, in addition, control the clock rate of the array, by, for example, slowing it down (and thus allowing more integration time) only in the zone of the array where the spot appears.

While usable primarily in connection with triangulation spots, this same technique can also be used on reflected or transmitted waves to decrease blur where a zone of reading can be determined.

The technique just disclosed for locking up the axes encoders at the start and stop points of the zone can also be applied to the start and stop points of an axes compensation sensor.

In a more sophisticated version of the FIG. 8 control system, the total "frame" of the array, i.e., substantially all elements, can be read into a memory at a given clock rate, while reading all encoder data from axes encoders (and axes compensation units, if used) into a second memory in timed relationship with respect to the array clock rate. Then, after the fact, the triangulation spot, edge image, or any other feature, can be found by scanning the image stored in the first memory, and when found, its position can be noted relative to the encoder positions stored in memory to determine the encoder values at the position in time that the image point or feature of interest was determined.

Although the invention has been described in detail with respect to exemplary embodiments thereof, it will be understood by those of ordinary skill in the art that variations and modifications may be effected within the scope and spirit of the invention.

I claim:

1. A method for determining at least one dimension, location or other characteristic of a part being inspected utilizing an optical sensor attached to an inspection machined, said method comprising the steps of:

providing a read command signal to cause the optical sensor to begin sensing and, at essentially the same time, determining a first position of at least one axis of the inspection machine, determining a second position of said at least one axis when the sensor, in sensing the part, has accumulated sufficient data from sensing the part to provide a useful reading, determining, from the first and second positions of said at least one axis, data related to an intermediate position of said at least one axis between said first and second positions, and determining from a combination of said intermediate location data and said sensor reading, the characteristic of the part.

2. A method according to claim 1 in which axes compensation sensors are used and the intermediate location of the axes compensation sensors is further determined.

3. A method according to claim 1 wherein said light sensor comprises a scanning photodetector array and said first and second axis positions are determined within a single photodetector array scan.

4. A method according to claim 1 wherein multiple positions of said axis, between said first and second positions, are sequentially stored in memory with respect to time and related to time based sensor data stored in a further memory during a scan of said sensor so as to more accurately determine the axis position at the time a feature of said part is sensed.

* * * * *